Nov. 3, 1970         L. H. DOROW         3,538,333
ELECTRO-OPTICAL DISPLACEMENT AMPLIFIER
Filed Jan. 4, 1968

INVENTOR.
Lyle H. Dorow
BY
Albert F. Duke
ATTORNEY

United States Patent Office 3,538,333
Patented Nov. 3, 1970

3,538,333
ELECTRO-OPTICAL DISPLACEMENT
AMPLIFIER
Lyle H. Dorow, Milwaukee, Wis., assignor to General
Motors Corporation, Detroit, Mich., a corporation of
Delaware
Filed Jan. 4, 1968, Ser. No. 695,693
Int. Cl. G01b 7/30; G01c 22/00
U.S. Cl. 250—201                                3 Claims

ABSTRACT OF THE DISCLOSURE

An electro-optical displacement amplifier is disclosed which includes a pair of coaxially mounted cylinders of transparent material having inner opaque surfaces with scribed lines thereon which cooperate to form a plurality of light passages movable axially in response to an angular input displacement to one of the cylinders. A light sensitive servosystem is provided for sensing radiant energy passing through the cylinders and track the axial movement and also to scan the multiple light passages to average out transfer errors between the angular input displacement and the axial movement of any particular light passage. The angular output displacement of the servosystem provides a highly accurate amplification of the angular input displacement.

---

This invention relates to displacement amplifiers and more particularly to an electro-optical displacement amplifier including means for averaging out errors due to manufacturing tolerances.

There are many instances in which it is desirable to accurately detect the position or change of position of an angularly displaceable member such as the output shaft of an accelerometer or other device. This detection is often accomplished by means of a digital transducer, providing a digital output which can be readily processed by a computer. A common limitation of such transducers is the ability to very accurately detect small amounts of displacement. In order that the displacement may be more accurately detected, displacement amplifiers have been employed to supply an amplified output to the transducer.

It is the object of the present invention to provide a displacement amplifier for accurately amplifying small angular input displacements, utilizing electro-optical techniques.

It is the further object of the present invention to provide a displacement amplifier wherein angular input displacements are converted to relatively larger displacements of a light pattern which displacements are reconverted to angular output displacements and wherein any errors introduced in the conversion process are averaged out during the reconversion process.

In accordance with the present invention, an electro-optical displacement amplifier is provided which includes a pair of relatively rotatable cylinders formed of a transparent material. Each cylinder has an inner opaque surface provided with scribed lines which combine to form a plurality of light passages extending through the cylinders, the axial position of which changes with input displacements. The angular relationship between the scribe lines of the two cylinders are such that a small angular change in the input causes a proportionally larger change in the axial movement of the light passages. A closed loop servo system is provided to follow light transmitted through the passages and null at a position which corresponds to the average position of the plurality of light passages. This is accomplished by scanning each light passage with photosensitive means during the servo positioning so that any inaccuracies in the individual locations of the light passages are averaged out. The servomotor output which drives the photosenstive means also provides the amplified angular output.

Figure 1:
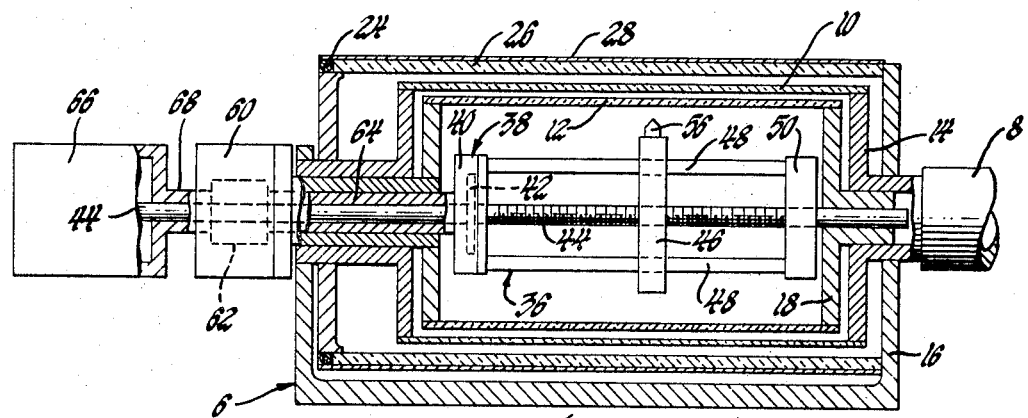
Figure 2:
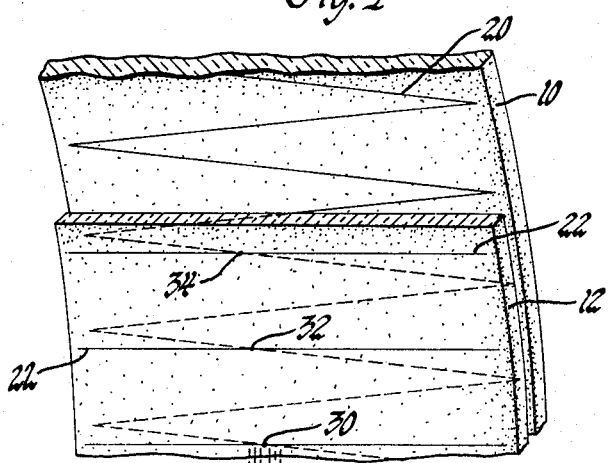
Figure 2:
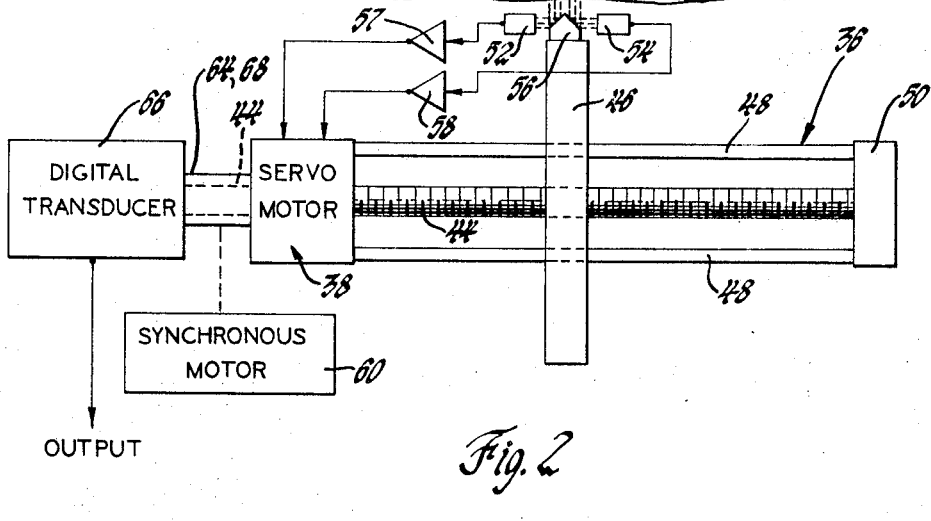

A more complete understanding of the present invention may be had from the following detailed description which should be taken in conjunction with the drawings in which FIG. 1 is a side elevation view with parts broken away and in section of a displacement amplifier embodying the present invention;

FIG. 2 is a schematic representation of the displacement amplifier of the present invention.

Referring now to the drawings and initially to FIG. 1, the displacement amplifier of the present invention is generally designated 6 and provides an amplified angular displacement output in response to an angular displacement input from a rotatable member 8. The displacement amplifier 6 comprises an input cylinder 10 and a stationary or reference cylinder 12. The cylinders 10 and 12 are made of a transparent material. The inner surfaces and edges of each of the cylinders 10 and 12 are opaque. The cylinder 10 is secured to a hub 14 which is journaled in a base or support member 16 and is adapted to be connected to the rotatable member 8. The cylinder 12 is secured to a hub 18 which is journaled within the hub 14. As shown in FIG. 2, the inner opaque surface of the cylinder 10 is inscribed with a continuous line 20 forming a triangular wave pattern. The inner opaque surface of the cylinder 12 is inscribed with a plurality of equally spaced parallel lines 22 extending around the inner diameter of the cylinder 12 anad parallel to the rotational axis thereof. The number of parallel lines 22 on the cylinder 12 corresponds to the number of cycles of the triangular wave pattern 20 on the cylinder 10.

As shown in FIG. 1, radiant energy from a circular tubular lamp 24 is transmitted through a stationary cylindrical light conducting element 26 provided with a shield 28 or other suitable means for directing light of substantially uniform intensity inwardly through the cylinders 10 and 12. Thus, the light passing through the cylinder 10 is of a triangular wave pattern while the cylinder 12 passes only that portion of the pattern which intersects the lines 22. Accordingly, the light which reaches the interior of the cylinder 12 passes through a plurality of light passages formed by the intersections 30, 32, 34 and so forth. Application of a displacement input to the cylinder 10 will cause movement of the intersections parallel to the axis of the cylinders 10 and 12. The determining factor in the amount of axial movement of the intersection 30, 32, 34, etc. is the angular relationship between the lines 20 and 22. It will be apparent that the greater the angle between the lines 20 and 22 the greater will be the axial movement of the intersections for a fixed angular input to the cylinder 10.

A closed loop servosystem generally designated 36 is provided to track the axial movement of the intersections. The servosystem 36 includes a servomotor 38 having a stator 40 and an armature 42. The armature 42 drives a position screw 44 extending from opposite sides of the armature 42. The position screw 44 is threadingly received in a carriage 46 which is movable by the position screw 44 in a left or right direction on a pair of parallel guide bars 48 which extend between the stator 40 and a support 50. The carriage 46 supports a pair of light detectors or photocells 52 and 54 located on opposite sides of an optical device 56 which may be an ararangement of prisms, beam splitters or other optical means adapted to receive the light passing through an intersection and direct the light to the two photocells 52 and 54.

The amount of light flux reaching each photocell is dependent on the relative axaial positions of one of the intersections 30, 32, 34, etc. and the optical device 56. For example, in FIG. 2 the intersection 30 and the optical device 56 are located at the same axial position and the two photocells 52 and 54 receive equal amounts of light flux. If the intersection 30 moves in the left or right direction, one photocell receives a greater amount of light flux and the other photocell receives a correspondingly less amount of light flux. The output of each photocell 52 and 54 is fed through amplifiers 57 and 58 and control the direction of rotation of the servomotor 38. The servomotor 38 may be a split-field series DC motor with the fields arranged to produce opposite torques with each field connected respectively to one of the photocells 52 and 54. The servomotor 38 through its armature 42 drives the position screw 44 in one direction or the other depending on the relative light flux reaching the photocells 52 and 54. Since the axial position of an intersection is related to the angular input and since the positioning of the photocells 52 and 54 to this axial position is accomplished through movement of the position screw 44, it will be understood that the angular movement of the position screw 44 is related to the input angle of the rotatable member 8. Furthermore, as a result of the angular relationship between the lines 20 and 22 and the pitch angle of the position screw 44, small angular displacements of the member 8 produce relatively large angular displacements of the position screw 44.

The inaccuracies introduced in the manufacture of the cylinders 10 and 12 and in placing the scribed lines 20 and 22 thereon to provide movable passages necessarily introduced some error between the movements of the different light passage in response to a particular rotational input to the cylinder 10. These inaccuracies are substantially eliminated in the embodiment shown by progressively sensing the axial location of each intersection. Any error existing in the axial location of a single intersection is thus averaged out providing a more accurate representation of the angular input. This averaging out process is accomplished by rotating the servo-system 36 at a constant speed so that the photocells 52 and 54 are successively responsive to the light passing through each intersection. Thus, while one intersection may be slightly to the left or right of another intersection for a given displacement input, the carriage 46 will be moved to a null position which represents the average axial position of all the intersections.

Rotation of the servo system 36 at a substantially constant speed is accomplished by a hysteresis synchronous motor 60. The motor 60 has a rotatable element 62 which drives a hollow shaft 64 which is coupled to the stator 40 of the servomotor 38. The parallel guide bars 48, being attached to the stator 40 and passing through openings in the carriage 46, cause rotation of the carriage 46 at the speed of the motor 60. The armature 42 of the servomotor 38 and, thus, the position screw 44 also rotate at the speed at the motor 60. Consequently, rotation of the servosystem 36 does not, in and of itself, produce any relative rotation between the position screw 44 and the carriage 46. Thus, insofar as that rotation of the position screw 44 which produces axial movement of the carrier 46 is concerned, the servosystem 36 may be considered as stationary. The position screw 44 extends leftwardly from the armature 42 through the hollow shaft 64 and is rotatable relative thereto. Thus, an angular input to the cylinder 10 causes an angular displacement of the position screw 44 relative to the shaft 64. This relative displacement may, if desired, be detected and indicated by means of a conventional digital transducer 66. In order for the transducer 66 to detect the angular displacement of the position screw 44 relative to the shaft 64, the transducer 66 is also coupled to the rotatable element 62 of the motor 60 by means of a hollow shaft 68 which receives the position screw 44.

The operation of the displacement amplifier is as follows: An angular displacement input from the member 8 causes a corresponding angular movement of the cylinder 10. This movement of the cylinder 10 produces axial movement of the intersections 30, 32, 34, etc. The photocells 52 and 54 respond to the light passing through each intersection 30, 32, 34, etc. and provide an input to the servomotor 38. The servomotor 38 drives the position screw 44, which in turn positions the carriage 46 at an axial location where equal amounts of light are received by the photocells 52 and 54. The motor 60 rotates the servo system 36 at a substantially constant speed and thus the photocells 52 and 54 successively respond to each of the intersections 30, 32, 34, etc. so that the axial null position of the carriage 46 represents the average axial position of all the intersections 30, 32, 34, etc. The angular displacement of the position screw 44 in locating the carriage 46 at this average axial position provides an output which is proportional to, and which is an amplified version of, the angular displacement input from the member 8. The output is then detected and read out by the digital transducer 66.

While the invention has been described with regards to a preferred embodiment thereof, this should not be construed in a limiting sense. Modifications and variations will now occur to those skilled in the art. For a definition of the invention, reference is made to the appended claims.

I claim:

1. An electro-optical displacement amplifier comprising a pair of elements which are relatively movable about a common axis and provided with means cooperating to form a plurality of light passages, the position of said passages in relation to said axis depending on the relative positions of said elements, one of said elements being movable in response to a displacement input to cause movement of said light passages, means providing a source of radiant energy on one side of said elements, a servo-system including light detector means located on the opposite side of said elements and responsive to the radiant energy exiting said passages to track the movement of said light passages and provide a displacement output proportional to said displacement input, means for rotating said servo system about said axis whereby said light sensitive means is successively reponsive to the light exiting from each of said passages.

2. An electro-optical displacement amplifier comprising a pair of cylinders formed of a transparent material and which are relatively movable about a common axis, one of said cylinders having an opaque surface with a continuous triangular wave pattern inscribed thereon, the other cylinder having an opaque surface with a plurality of lines parallel to said axis inscribed thereon, the intersections of said pattern with said lines providing a plurality of light passages, the axial position of said passages depending on the relative positions of said cylinders, one of said cylinders being movable in response to a displacement input to cause movement of said light passages, means for radiating energy toward the interior of said cylinders, a servosystem including radiant energy detector means located within such cylinders and responsive to the radiant energy exiting said passages to track the movement of said light passages and provide a displacement output proportional to said displacement input, means for rotating said servosystem about said axis whereby said light sensitive means is successively resonsive to the light exiting from each of said passages.

3. An electro-optical displacement amplifier comprising a pair of cylinders formed of a transparent material and which are relatively movable about a common axis, one of such cylinders having an opaque surface with a continuous triangular wave pattern inscribed thereon, the other cylinder having an opaque surface with a plurality of lines parallel to said axis inscribed thereon, the intersections of said pattern with said lines providing a plurality of light passages, the axial position of said passages depending on the relative positions of said cylinders, one of said cylinders being movable in response to a displacement input to cause movement of said light passages, means for radiating energy toward the interior of said cylinders, a servomotor having a stator and a rotatable element, a position screw driven by said rotatable element about said common axis, a carriage which threadingly receives said position screw and is movable along said axis in response to rotation of said position screw relative to said carriage, light detector means located within said cylinders and including a pair of photocells, said photocells being mounted on said carriage and providing an input to said servomotor as a function of the relative amount of light flux reaching the two photocells, means coupling said carriage to the stator of said servomotor, means for rotating said stator at a constant speed whereby said photocells are successively responsive to the light exiting from each of said passages.

References Cited

UNITED STATES PATENTS

| | | | |
|---|---|---|---|
| 1,859,828 | 5/1932 | Jenkins | 250—236 X |
| 3,037,420 | 6/1962 | Stade | 250—234 X |

JAMES W. LAWRENCE, Primary Examiner

E. R. LA ROCHE, Assistant Examiner

U.S. Cl. X.R.

318—18; 250—203, 236, 237; 356—150